Figure 1:
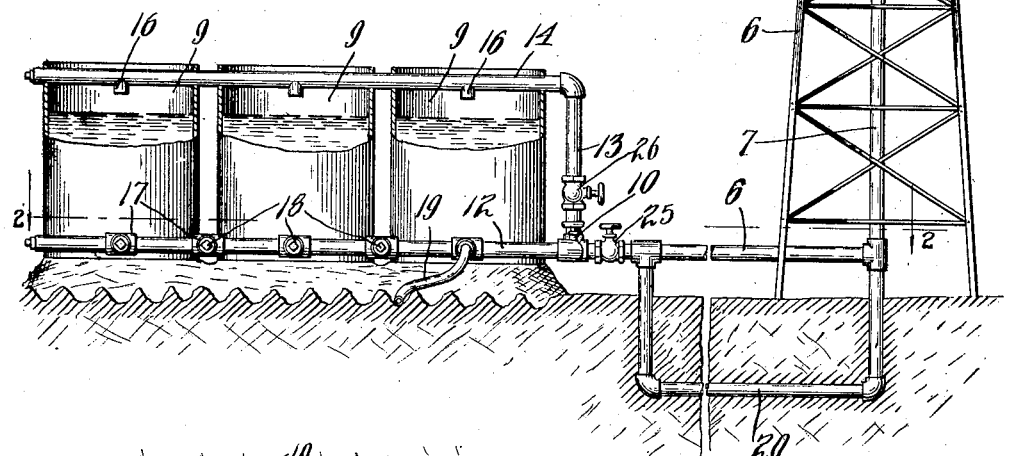

H. B. FRENCH.
IRRIGATING APPARATUS.
APPLICATION FILED FEB. 14, 1919.

1,355,222.

Patented Oct. 12, 1920.

Inventor
Horatio B. French

UNITED STATES PATENT OFFICE.

HORATIO BENJAMIN FRENCH, OF KEENE, TEXAS.

IRRIGATING APPARATUS.

1,355,222.

Specification of Letters Patent.

Patented Oct. 12, 1920.

Application filed February 14, 1919. Serial No. 277,082.

*To all whom it may concern:*

Be it known that I, HORATIO B. FRENCH, a citizen of the United States, residing at Keene, Johnson county, and State of Texas, have invented and discovered certain new and useful Improvements in Irrigating Apparatus, of which the following is a specification.

My said invention relates to a system of irrigation, in which provision is made for thoroughly irrigating large or small plats of land in a simple and efficient manner, and the object of my invention is to provide means whereby such a system will completely supply the desired area with sufficient water at a minimum cost of construction and operation.

With these and other objects in view, the invention consists in the combination and arrangement of parts more fully described in the specification and particularly pointed out in the appended claims, reference being had to the accompanying drawings forming a part hereof, in which like reference characters designate like parts in the views, in which—

Figure 2:
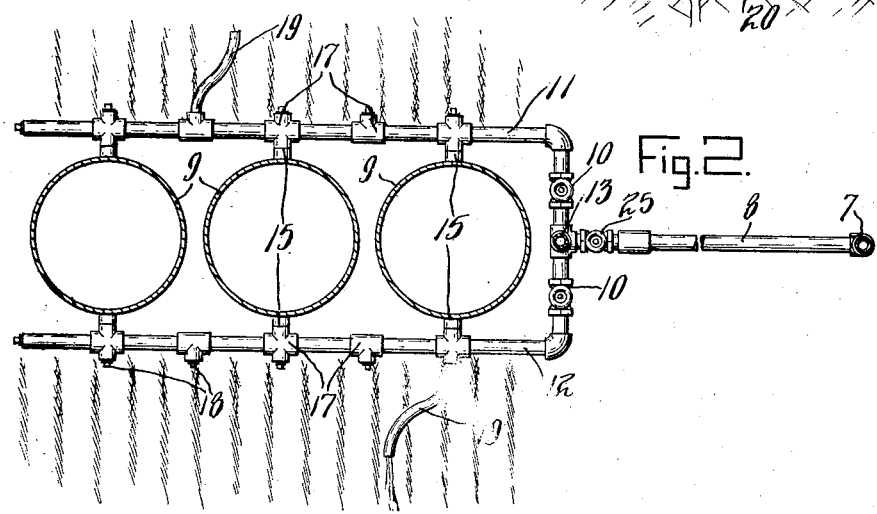

Figure 1 is an elevation of the apparatus employed in the operation of the system with parts broken away to more clearly illustrate the structure, and Fig. 2 a horizontal section as viewed from the dotted line 2—2 in Fig. 1.

In said apparatus a supply tank 5 is elevated above the ground on a supporting structure 6 a sufficient distance to afford sufficient force to the water contained therein to cause it to flow through a supply pipe 7, and a branch pipe 8, which runs above the ground and is designed to empty its contents into a series of reservoirs 9 of which there may be any suitable number. Suitable valves 10 are interposed at a convenient point in the pipes leading from the supply to the branches on each side of the reservoirs 9.

As shown, the supply pipe branches off into two horizontally disposed pipes 11 and 12 which pass on opposite sides of the reservoirs 9 and a vertical pipe 13, which in turn is provided with a horizontal extension 14 which passes through the reservoirs 9 near the top thereof. These pipes 11, 12 and 14 afford means for filling the reservoirs 9 in the following manner: Branch pipes 15 are connected between the respective members 11 and 12 and the adjacent reservoirs 9 near the bottom thereof which will permit the water to flow into the reservoirs through both of the pipes 11 and 12, or either one according to adjustment of valves 10. The pipe 14 is provided with a series of nozzles 16 located within the reservoirs 9 which also serve the purpose of assisting in filling the reservoirs. At suitable intervals the pipes 11 and 12 are provided with connections 17 normally closed by screw plugs 18. When it is desired to irrigate a portion of a garden or land, one end of a portable hose 19 is inserted in the place of any of the plugs 18 with its opposite end lying in the furrow to be irrigated. When this respective furrow has been properly irrigated it is only necessary to remove the hose from the said furrow to the next one and so on until the desired surface has been irrigated.

In the event that the pipe 8 should have become frozen or clogged in any way, I provide a by-pass 20 which is mounted beneath the surface of the ground and which again connects with the pipe 8 immediately in front of the valve 10.

Pipes 8 and 20 may be used together or alternately. Where the tank 5 is separated from the reservoirs 9 by roadways it is necessary to use the underground pipe only. Again, it is sometimes necessary to fill the several reservoirs while they are being emptied. For example pipes 11 and 14 can be used to fill the reservoirs while pipe 12 is being used to supply water therefrom to irrigate a plat of ground, or vice versa.

Having thus fully described my said invention, what I claim as new, and desire to secure by Letters Patent is:

1. A system of surface irrigation comprising a main supply tank, a series of reservoirs, pipes connecting said tank and reservoirs, parallel pipes connected with said reservoirs, a series of outlets in said parallel pipes, and a portable pipe connected to one of said outlets and adapted to be shifted from one to another interchangeably, substantially as set forth.

2. A system of surface irrigation comprising a main supply tank, a series of reservoirs, spaced and substantially parallel pipes extending along the surface either side of said reservoirs, laterals connecting said pipes to said reservoirs, couplings providing normally closed outlets connected in said spaced parallel pipes at intervals, and a flexible conduit on one and adapted to be interchangeably connected to any of said couplings, substantially as set forth.

In witness whereof, I have hereunto set my hand and seal at Keene, Texas, this 20th day of January, A. D. nineteen hundred and nineteen.

HORATIO BENJAMIN FRENCH. [L. S.]

Witnesses:
L. N. CARTER,
A. M. WOODALL.